M. C. A. C. KROEGER.
ATTACHMENT FOR FLOWER POTS AND THE LIKE.
APPLICATION FILED JUNE 17, 1908.
923,663.
Patented June 1, 1909.
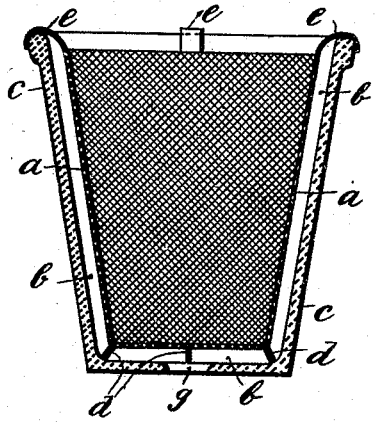
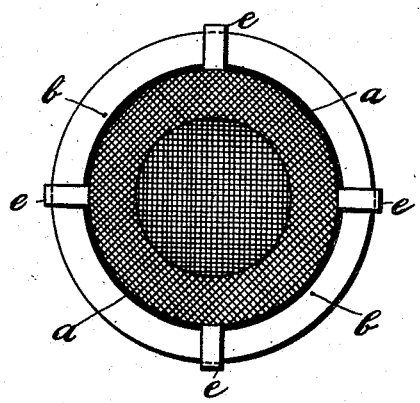
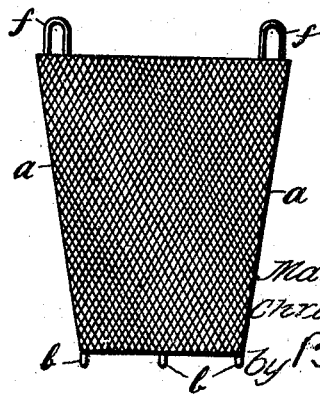

UNITED STATES PATENT OFFICE.

MARTIN CARL ADOLPH CHRISTIAN KROEGER, OF GERRARDS CROSS, ENGLAND.

ATTACHMENT FOR FLOWER-POTS AND THE LIKE.

No. 923,663.     Specification of Letters Patent.     Patented June 1, 1909.

Application filed June 17, 1908. Serial No. 438,983.

*To all whom it may concern:*

Be it known that I, MARTIN CARL ADOLPH CHRISTIAN KROEGER, a subject of the Emperor of Germany, of Westover, Gerrards Cross, in the county of Buckingham, England, scientist, have invented a new and useful Improved Attachment for Flower-Pots and the Like, of which the following is a specification.

This invention relates to a new or improved attachment for flower pots and the like and it has more particular reference to the ordinary earthenware pots which are used under glass or for window boxes.

It is a well known fact that plants, flowers and vegetables which are grown under glass are weakened through lack of a proper supply of fresh air, furthermore that whenever " forcing " takes place the strength decreases. I have discovered by experiments that when a free supply of air is supplied about, and allowed to permeate freely, the soil in which plants and flowers are grown, a very marked improvement in the growth and strength takes place.

Now, the object of the present invention is to utilize the foregoing discovery by providing a simple, cheap and effective attachment for flower pots and the like which allows the air to freely circulate about and penetrate the interstices of the soil or mold, and which furthermore greatly facilitates the repotting or transference of plants and flowers from one pot to another.

To this end the invention consists essentially of a perforated receptacle which is adapted to fit within an ordinary flower-pot or the like, but to leave a space or clearance around and beneath said receptacle so that air can freely circulate thereabout.

The accompanying drawing is in illustration of the present invention, Figure 1 being a central vertical section through a flower-pot fitted with my new or improved attachment. Fig. 2 is a plan of the same, and Fig. 3 is an elevation of a slightly modified form of the invention.

According to the form of my invention illustrated I construct a receptacle $a$ in the form of an ordinary flower pot from any suitable finely meshed material such as galvanized metal mesh-work, wire gauze or the like. This receptacle $a$ is made of such a size as to leave a clear space $b$ all around its outer wall or side and below the bottom thereof when placed within the flower pot $c$. Obviously the size of the receptacles $a$ will vary according to the capacity of the pots with which they are to be used as I find that it is only necessary to leave a clearance of from $\frac{1}{4}$ of an inch upward according to the size and aeration requirements; certain plants and flowers needing more air than others.

$d$, $d$ are short feet or projections from the bottom of the receptacle $a$ for supporting it within the flower pot $c$, and $e$, $e$ are turned over strips of metal which are adapted to engage with the upper rim of the pot $c$ and prevent lateral or accidental displacement. These strips of metal $e$, $e$ serve also as handles for lifting the receptacle $a$ out of the pot $c$ when desired, or handles $f$, $f$ (Fig. 3) may be fitted and the strips $e$, $e$ dispensed with. $g$ is the usual drain hole in the pot $c$.

In Figs. 1 and 2 is illustrated a receptacle constructed from galvanized mesh-work, while Fig. 3 shows a wire basket $a$.

From the foregoing it will be readily understood that by the improved plant-holder being made a little smaller than the flower pot there is insured a plentiful supply of fresh air to the plant which is so essential to enhance healthy growth and the keeping of the soil fresh and productive, furthermore, perfect drainage is provided whereby premature decay is obviated.

The details of construction may be considerably varied without in any way departing from the nature of the invention, for example, the size and shape or form will be dependent upon that of the article with which the improved plant holder is to be employed. The shape, position and arrangement of the handles and feet may be modified, or the latter dispensed with and the receptacle $a$ simply supported from the rim of the pot $c$, and the application of the invention to window boxes and the like will be readily understood without further description or illustration.

What I claim as my invention and desire to secure by Letters Patent, is:—

In combination with a flower pot provided with a single drainage opening in its bottom wall and having its remaining wall portions imperforate and its top portion open, and a perforated integral receptacle reduced in size with respect to said pot to form an intervening air space surrounding said receptacle, said receptacle having supports engaging the bottom wall of the pot to form an intervening air space between the bottom of said receptacle and the bottom of said pot, said receptacle also having curved arms projecting therefrom and engaging the upper margin of the pot to maintain said receptacle in concentric relation with respect to said pot.

In witness whereof I have hereunto set my hand in the presence of two witnesses.

MARTIN CARL ADOLPH CHRISTIAN KROEGER.

Witnesses:
  ALFRED T. BRATTON,
  SIDNEY H. BECKWITH.